April 25, 1933. H. A. THOMPSON 1,906,021
RAILWAY TRAFFIC CONTROLLING APPARATUS
Filed Dec. 26, 1931 8 Sheets-Sheet 1

INVENTOR.
Howard A. Thompson.
By A. R. Vinnell
HIS ATTORNEY.

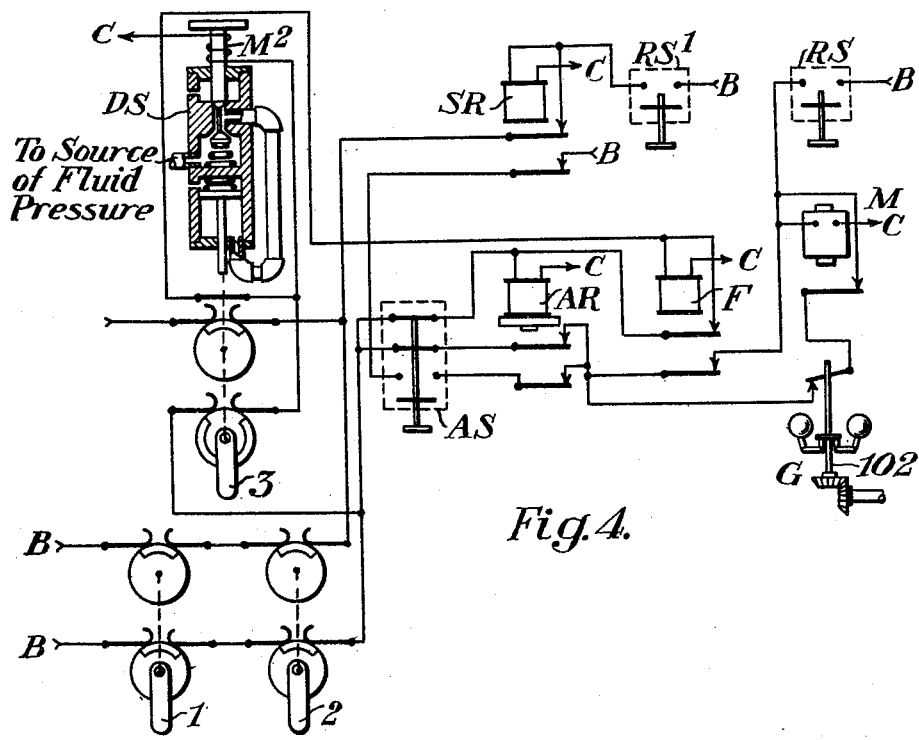
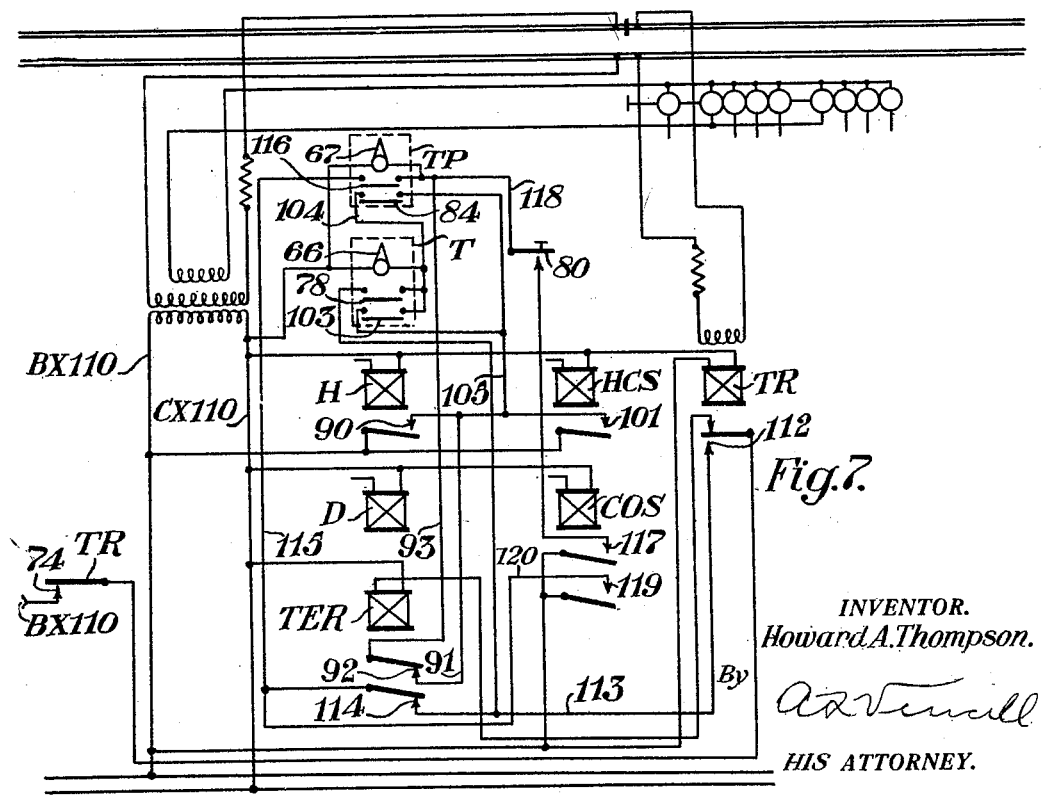
Fig. 4.
Fig. 7.
INVENTOR.
Howard A. Thompson.
HIS ATTORNEY.

April 25, 1933.  H. A. THOMPSON  1,906,021
RAILWAY TRAFFIC CONTROLLING APPARATUS
Filed Dec. 26, 1931   8 Sheets-Sheet 5
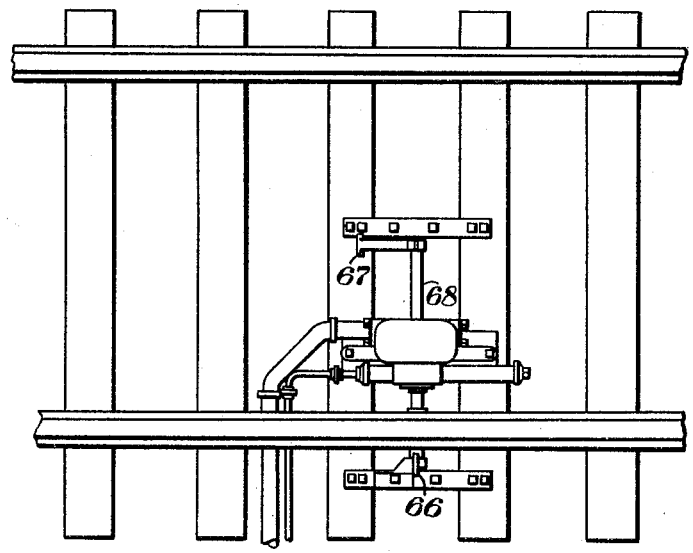
Fig. 8.ᵃ
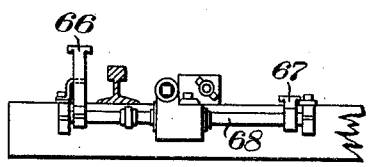
Fig. 8.ᵇ
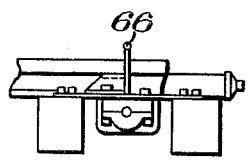
Fig. 8.ᶜ
INVENTOR.
Howard A. Thompson.
By
HIS ATTORNEY.

April 25, 1933. H. A. THOMPSON 1,906,021
RAILWAY TRAFFIC CONTROLLING APPARATUS
Filed Dec. 26, 1931    8 Sheets-Sheet 6

INVENTOR.
Howard A. Thompson.
By
HIS ATTORNEY.

INVENTOR.
Howard A. Thompson.

Patented Apr. 25, 1933

1,906,021

UNITED STATES PATENT OFFICE

HOWARD A. THOMPSON, OF EDGEWOOD, PENNSYLVANIA, ASSIGNOR TO THE UNION SWITCH & SIGNAL COMPANY, OF SWISSVALE, PENNSYLVANIA, A CORPORATION OF PENNSYLVANIA

RAILWAY TRAFFIC CONTROLLING APPARATUS

Application filed December 26, 1931. Serial No. 583,372.

My invention relates to railway traffic controlling apparatus, and particularly to apparatus for controlling the speed of trains.

This present application is a continuation in part of my copending application, Serial No. 506,033, filed Jan. 2, 1931, ror Railway traffic controlling apparatus, in so far as the subject matter common to the two applications is concerned.

I will describe several forms of apparatus embodying my invention, and will then point out the novel features thereof in claims.

Figure 1:
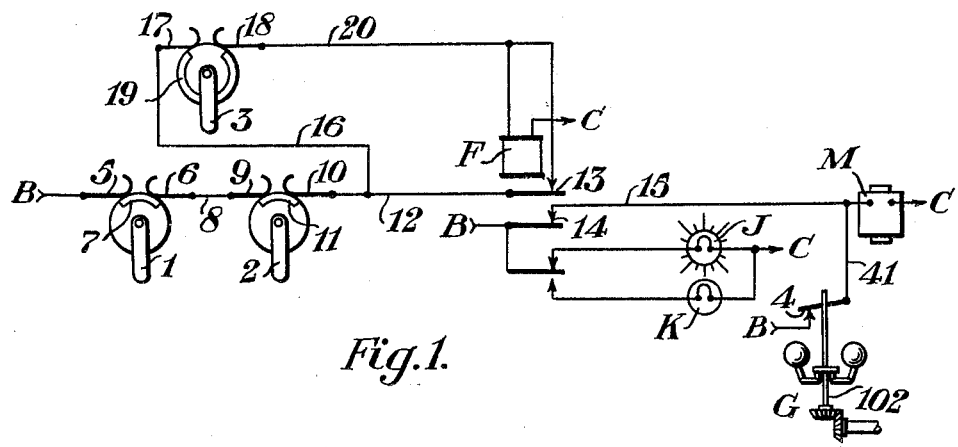
Figure 2:
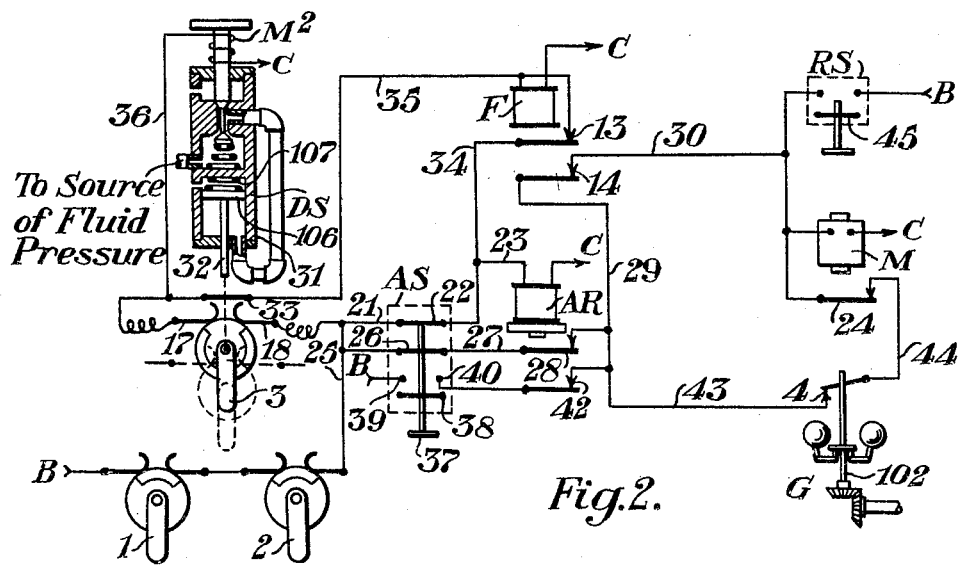
Figure 3:
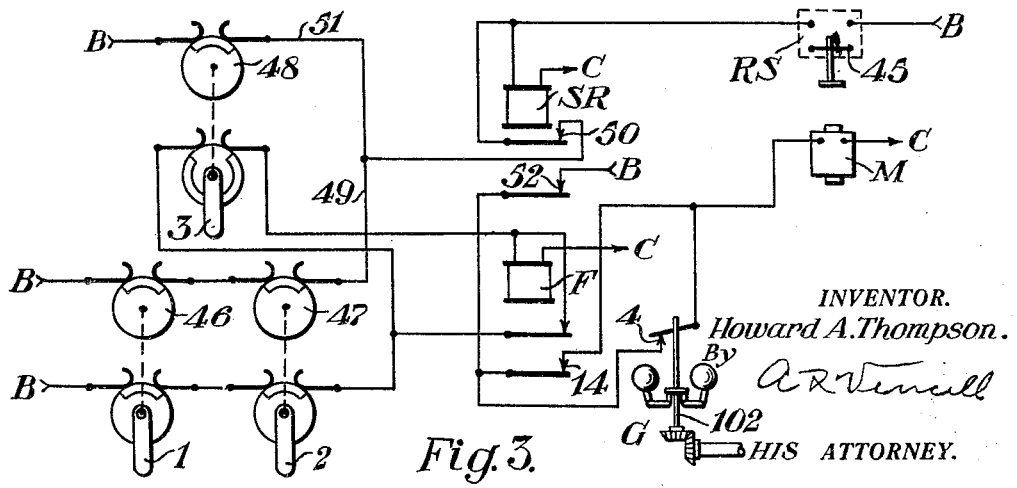
Figure 5:
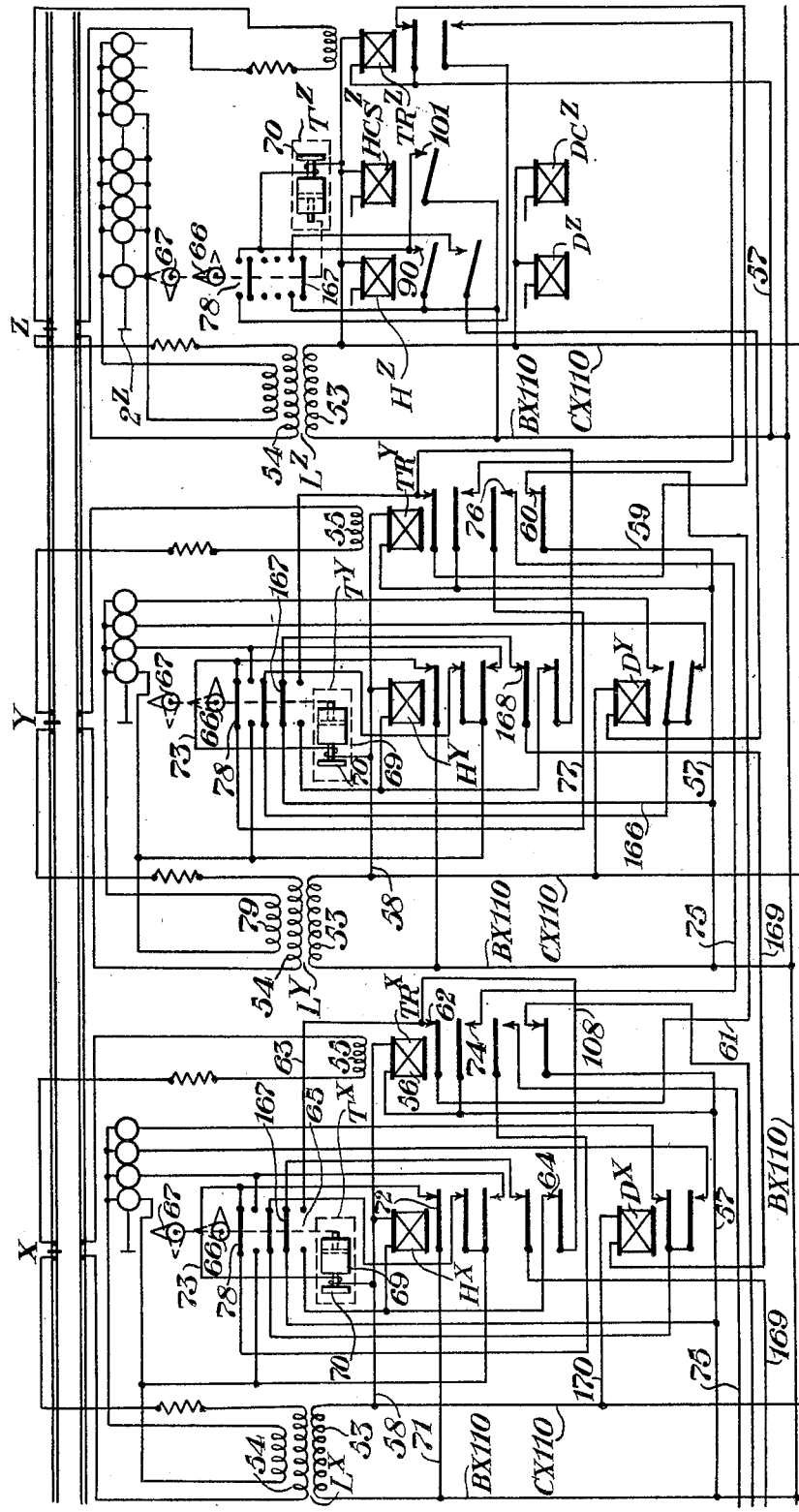
Figure 6:
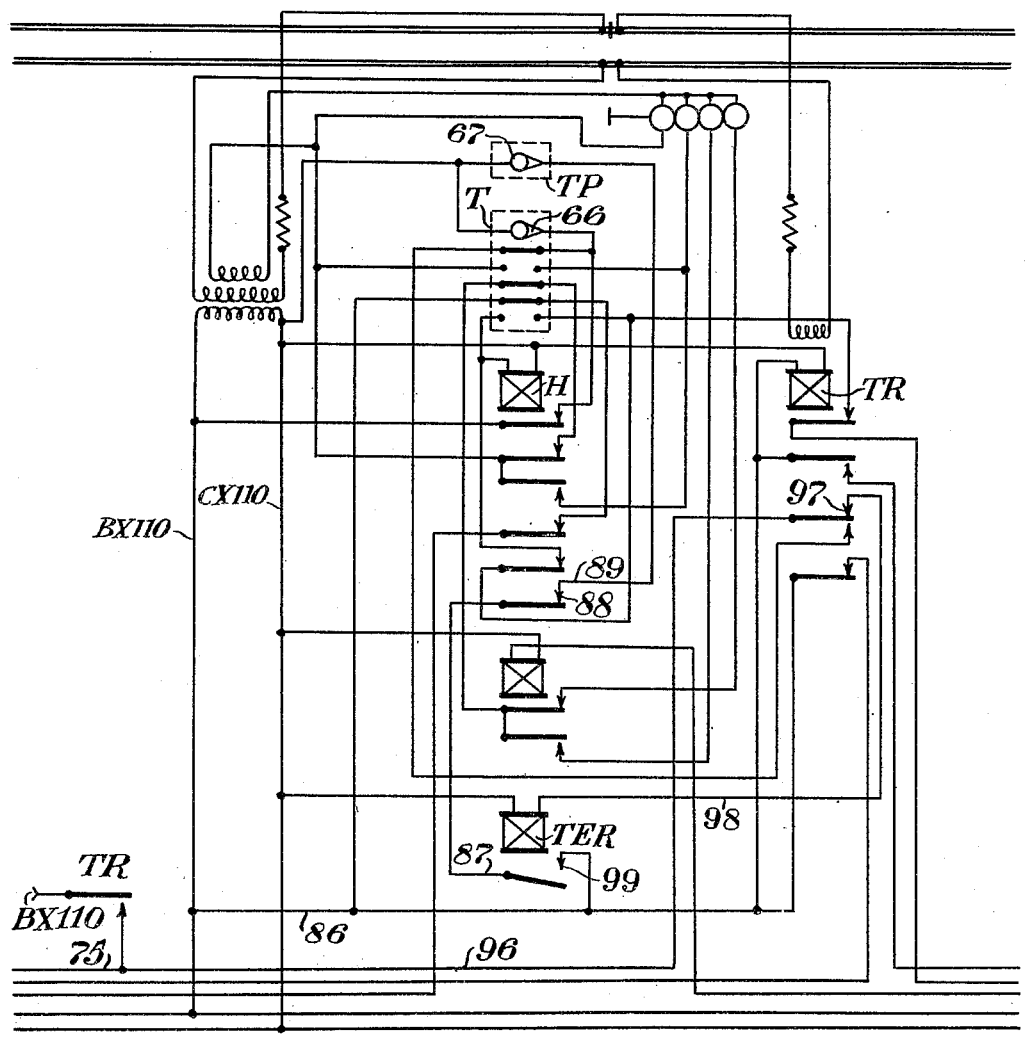
Figure 9:
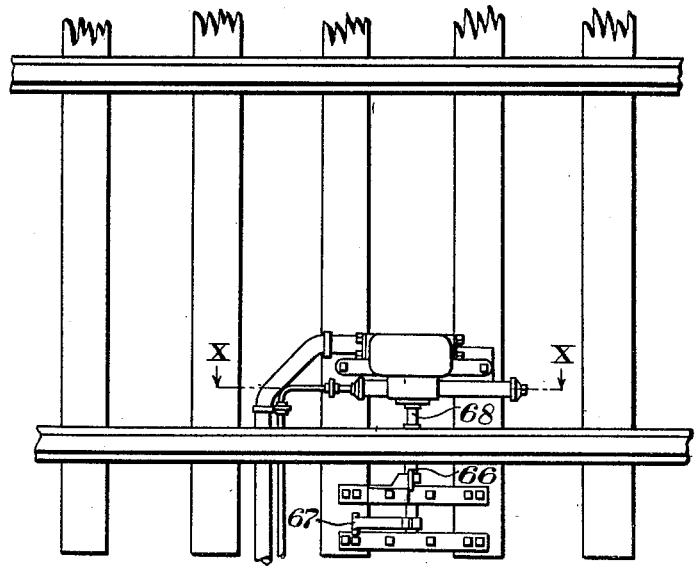
Figure 10:
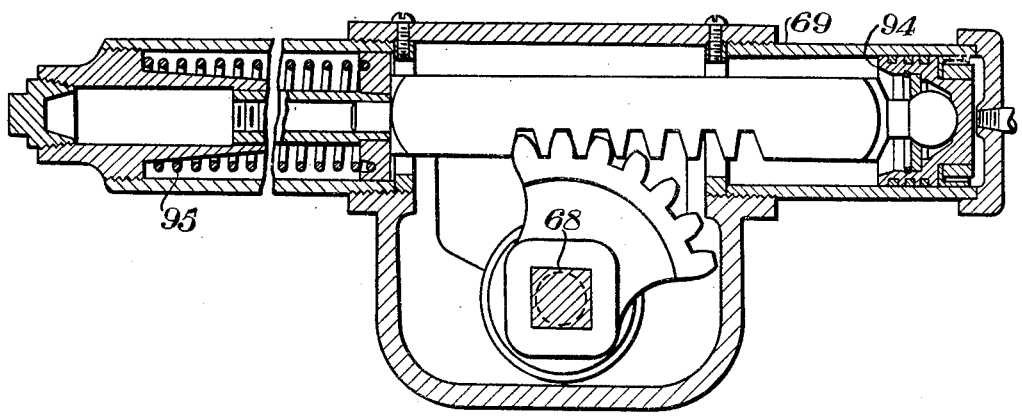
Figure 11:
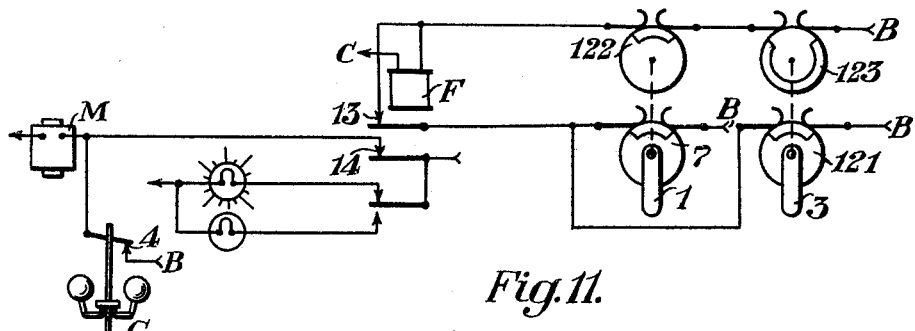
Figure 12:
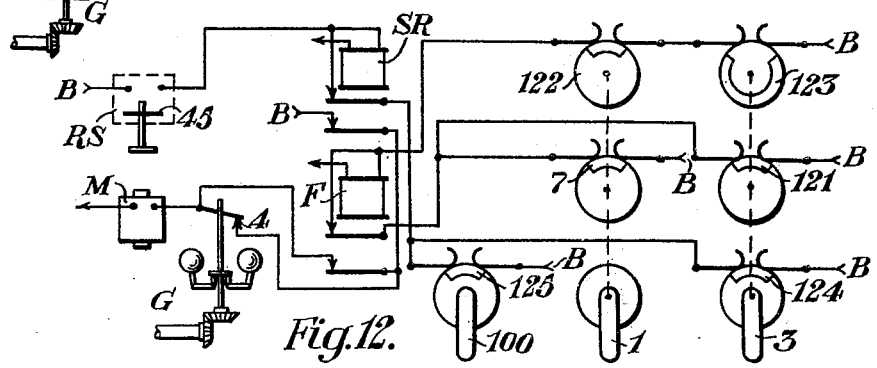
Figure 13:
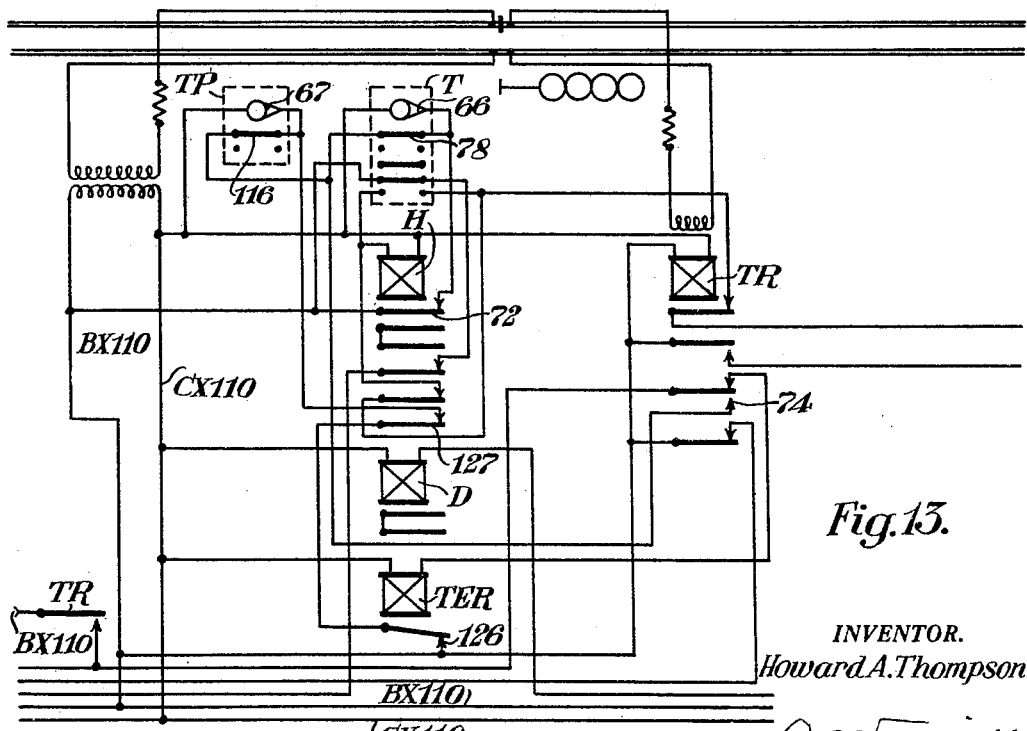
Figure 14:
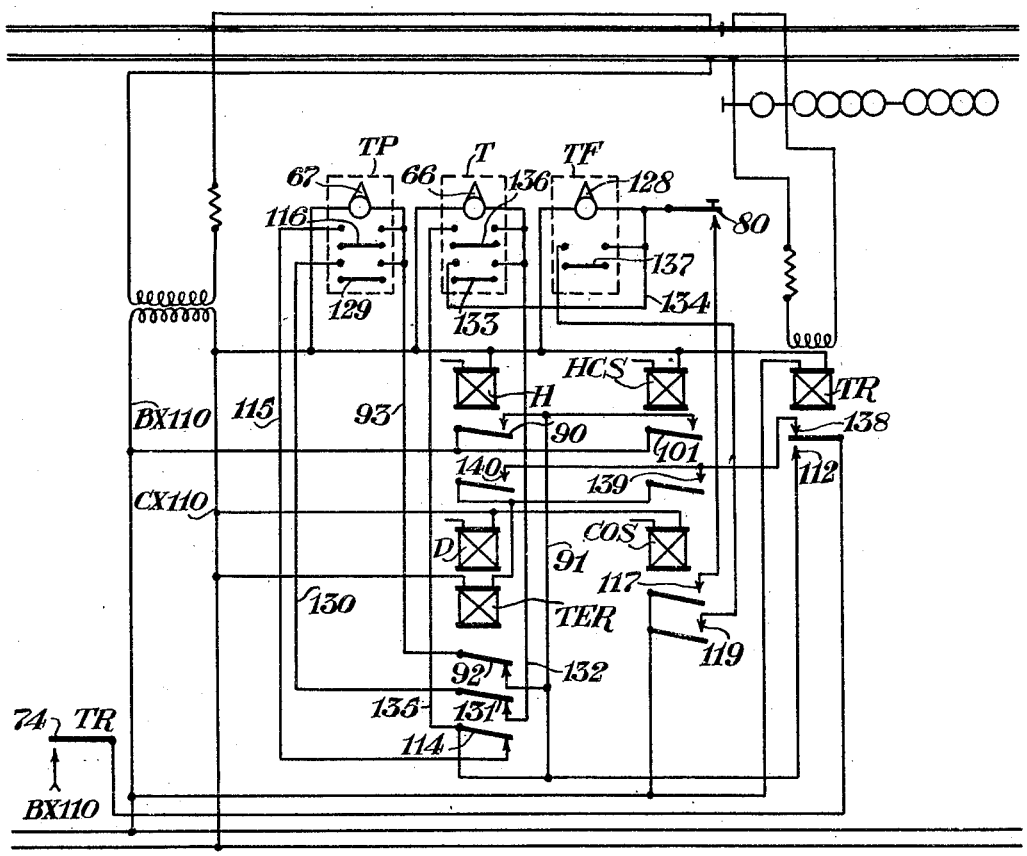

In the accompanying drawings, Fig. 1 is a diagrammatic view of car carried apparatus arranged to provide an automatic stop and an automatic reset in conjunction with speed control. Fig. 2 is a diagrammatic view of car carried apparatus including a manual acknowledging switch, an acknowledging relay, a sealed reset switch and a disengaging device added to the apparatus of Fig. 1. Fig. 3 is a diagrammatic view of car carried apparatus in which a positive stop feature has been added to the apparatus of Fig. 1. Fig. 4 is a diagrammatic view of car carried apparatus in which the positive stop feature has been added to the apparatus of Fig. 2. Fig. 5 is a diagrammatic view of trackway circuits and apparatus preferably used at signal locations where the automatic stop mechanism is provided and where a positive stop is not required. In this Fig. 5, an automatic reset arm has been added to the usual trip arm mechanism. Fig. 6 is a diagrammatic view of wayside apparatus at an automatic signal location such as shown in the Fig. 5, modified to use two operating mechanisms, one to operate the trip arm and a second mechanism to operate the reset arm. In this Fig. 6, a timing device is added to delay the energizing of the mechanism for the reset arm. Fig. 7 is a diagrammatic view of a form of the wayside apparatus that may be used at interlocking signal locations where the reset arm does not engage with the car carried reset arm at speed, but so arranged that it may be used to enforce a positive stop and also to reset the car apparatus. Figs. 8ᵃ, 8ᵇ and 8ᶜ are views showing a preferred location of the trackway trip and reset arms. Fig. 9 is a view showing a second possible location of the trip and reset arms. Fig. 10 is a cross-section of a preferred form of mechanism used to operate the trackway trip and reset arms. This view is taken on the line X—X of the Fig. 9. Fig. 11 is a diagrammatic view of the car carried apparatus also embodying my invention where the trip arm and the reset arm are mounted on the car in tandem for providing an automatic stop and an automatic reset in conjunction with speed control. Fig. 12 is a diagrammatic view of the car carried apparatus where three car carried arms are mounted successively on the same longitudinal center line in order to add the positive stop feature to the system of Fig. 11. Fig. 13 is a diagrammatic view of the wayside apparatus at an automatic signal location where the trackway trip and reset arms are located in tandem for cooperating with the car carried apparatus of either Fig. 11 or 12. Fig. 14 is a diagrammatic view of the wayside apparatus that may be used at interlocking signal locations where three trackway arms are mounted three in a line for establishing a positive stop in conjunction with the car carried apparatus of Fig. 12.

In describing my invention, reference is made to the accompanying figures wherein like characters of reference designate corresponding parts.

In Fig. 1, the reference characters 1 and 2 designate trip arms that are suspended from the body or trunk of the car in the customary manner so as to clear all roadbed equipment but still in a position to engage a trackway trip arm, to be referred to later. The trip arms 1 and 2 are preferably located on the car, one on the front and left side and the other on the rear and right side of the car. These locations of the two trip arms permit the car to be operated with either end first over a trackway, where only one track trip arm is installed at each signal location. The reference character 3 designates a reset arm, that is to be mounted on the car in the manner similar to the arms 1 and 2 but preferably located on the center line of the car so that it will engage, irrespective of which end of the car is first, with a wayside reset arm located midway between the rails. It will be understood of course that my invention is not confined to the above suggested locations of the car carried arms but that their location may be altered to suit local conditions if proper mechanical clearances and proper operation cannot be obtained by the above proposed arrangements. All car carried trip and reset arms are used to operate circuit controllers which in turn govern the operation of the air brake equipment, and when they are disengaged from coordinating trackway arms they assume the position shown in the figures.

Each car or group of articulated units is equipped with a speed governor designated in the Fig. 1 by the reference character G. This speed governor may be one of many numerous types used in speed control systems and is here shown in the inertia fly-ball type, it being understood that the shaft 102 on which the fly-balls are mounted is driven from a car axle through the medium of a proper train of gears. This speed governor G operates a single circuit controller 4 which is so adjusted that its contact is closed as shown in the figures at all speeds below some predetermined low speed which I shall speak of in this description as being 10 miles per hour. At all speeds above this predetermined speed limit of 10 miles per hour, the contact 4 is opened.

Each car is equipped with a brake controlling magnet valve M. This magnet valve is preferably of the well-known type widely used in electropneumatic systems. The brake valve for governing the operation of the air brakes and which is controlled by the magnet valve M may be of any of the types used in present day systems and as it forms no part of my invention, it is not shown in the drawings. Suffice to say that its action is governed by the magnet valve M in such a manner that the air brakes are held released as long as the magnet valve M is energized, and that the deenergization of the magnet valve M causes the brake valve to initiate an application of the air brakes. The application may be either a service application or an emergency application depending upon the degree desired.

Each car or articulated unit is provided with a stick relay designated in the Fig. 1 by the reference character F. A convenient source of current such as a battery is also provided for each car or unit and while this source is not shown in the figures, its positive and negative terminals are designated by the reference characters B and C, respectively. Normally, the stick relay F is energized by current supplied from the positive terminal B over contact 5, bridging piece 7 operated by the trip arm 1, contact 6, wire 8, contact 9, bridging piece 11 operated by the trip arm 2, contact 10, wire 12, front contact 13 of the relay F, winding of relay F and to the negative terminal C. While this circuit is normally closed it is apparent that a slight movement of either arm 1 or 2 to either the right or left will rupture the circuit. The brake controlling magnet valve M is also normally energized, the circuit being from the positive battery terminal B, through a front contact 14 of the stick relay F, wire 15, winding of the magnet M and to the negative terminal C. The magnet M being thus normally energized it follows that normally the automatic control of the air brakes is held in abeyance and the operator is left free to govern his train. The pick-up circuit for the stick relay F is from the positive terminal B through the normally closed contacts 5—6 and 9—10 of the trip arms 1 and 2, respectively, to the wire 12 and then along wire 16, through contact 17, bridging piece 19 of the reset arm 3 when swung either to the right or to the left, contact 18, wire 20, coil of relay F and to the negative terminal C. The magnet M is also energized by current from the positive terminal B through the contact 4 of the speed governor G when it is closed as it will be at speeds below 10 miles per hour, wire 41, coil of magnet M and to the negative terminal C. Indicator lights J and K may be provided on the car as means to inform the operator as to the condition of the stick relay F. As shown, the light J is normally illuminated through a front contact of the stick relay F and the light K energized through a back contact of the stick relay F as will be readily understood from Fig. 1.

In passing a clear or caution wayside signal, the reset arm 3 will engage a reset arm of the wayside equipment as will be described later, causing the arm 3 to swing either to the right or to the left so as to bring the bridging piece 19 into engagement with both the contacts 17 and 18. With the car apparatus normal, as shown in Fig. 1, the closing of the contact between 17 and 18 at each clear or caution signal merely provides a momentary auxiliary path for energizing the relay F. In passing a stop wayside signal, the reset arm 3 is not engaged, but one of the trip arms 1 or 2 becomes engaged with a trackway trip arm swinging the arm 1 or 2 either to the right or to the left to open the stick circuit of the relay F. The deenergizing of the stick relay F opens the normal circuit for energizing the magnet M at the contact 14. Also the indicator light J is deenergized and the lamp K illuminated as the relay F becomes deenergized. Should the train be traveling at a speed above the predetermined limit of 10 miles per hour and contact 4 thus open, the magnet valve M is deenergized and an automatic application of the brakes incurred. In the event the speed of the car is at or below 10 miles per hour so that contact 4 is closed, the magnet M is retained energized even though the front contact 14 of the stick relay is opened. That is to say, if a train passes a stop signal at a speed below the set limit, no automatic application of the brakes takes effect, although the engaging of the car trip arm with a wayside trip arm does occur. However, at the stop signal the engagement between the car trip arm and the trackway trip arm has deenergized the stick relay F and the car cannot travel at a speed above the set limit of the speed governor G until the relay F is reenergized without incurring a brake application. At the first caution or clear signal passed by the car after passing a stop signal, the reset arm 3 becomes engaged with a trackway reset arm and arm 3 is swung to bring bridging piece 19 into engagement with the contacts 17 and 18 with the result that the stick relay F is reenergized and magnet M again energized over the normal path through the contact 14 and the car is released from the speed restriction. The result is therefore that a car can pass a wayside trip arm set in its stop position without a brake application only at a speed at or below the set limit of the speed governor. Also at no point after passing the stop signal can the car accelerate its speed above the set limit of 10 miles per hour until it encounters a caution or clear signal at which point an automatic restoring of the apparatus takes place.

In Fig. 2, an acknowledging switch AS, an acknowledging relay AR, a sealed reset switch RS and a disengaging device DS are added to the car carried apparatus disclosed in Fig. 1. The acknowledging relay AR is normally energized over a circuit from the positive terminal B through the normally closed circuit controllers operated by the trip arms 1 and 2, wire 25, wire 21, a contact 22 of the acknowledging switch AS, wire 23, winding of relay AR and to the negative terminal C. This acknowledging relay is made slow-releasing, the time at which its front contacts will open being some predetermined period after the relay becomes deenergized. While this release period may be set to suit conditions it will be spoken of in this description as being seven seconds.

The brake controlling magnet valve M of Fig. 2 is provided with a circuit controlling armature 24, and in this form of car carried apparatus, current is normally supplied to the magnet M from the positive terminal B through the circuit controllers of the trip arms 1 and 2, wire 25, contact 26 of the acknowledging switch AS, wire 27, contact 28 of the acknowledging relay AR, wire 29, contact 14 of the stick relay F, wire 30, winding of the magnet M and to the negative terminal C. The disengaging device DS comprises a pneumatically operated piston 106 within the cylinder 31. On the rod 32 extending through one end of the cylinder 31 is mounted the reset arm 3 together with a circuit controller 33. Pressure to and from the cylinder 31 is controlled by a magnet valve $M^2$, it being arranged that with the magnet $M^2$ energized, pressure is admitted to the cylinder 31 to thereby raise the piston and the reset arm 3 into a position as shown in the full lines of Fig. 2. With magnet valve $M^2$ deenergized, pressure is exhausted from the cylinder 31 and under the action of gravity, the reset arm 3 drops to a position shown by the dotted lines in Fig. 2 and the controller 33 is opened. A spring 107 may be added if desirable to assist in forcing the reset arm 3 downward. With the reset arm 3 lifted to its raised position, it will not engage the reset arms on the track, but when lowered as a result of the deenergizing of the magnet valve $M^2$, the arm 3 is then in a position to engage the trackway reset arms. The magnet $M^2$ is normally energized by current flowing from the positive terminal B through the circuit controllers of the trip arms 1 and 2 along wire 25, wire 21, contact 22 of the acknowledging switch AS, wire 23, wire 34, stick contact 13 of the stick relay F, wire 35, circuit controller 33, wire 36, winding of $M^2$ and to the negative terminal C. With $M^2$ normally energized, it follows that normally the reset arm 3 is held up out of engagement with all trackway reset arms, which avoids the impact between the car carried reset arm and the trackway reset arm at high speeds at successive clear and caution signals. When a car passes a stop signal and either the trip arm 1 or 2 engages the track trip arm the circuit to the magnet $M^2$ is opened at the controller of the trip arm and the deenergizing of $M^2$ allows the reset arm 3 to immediately drop to its engaging position as pointed out above.

In Fig. 2 the actuating of a trip arm on the car also cuts off current from the stick relay F and its contacts 13 and 14 are opened in the same manner as described in Fig. 1. As a car passes a stop signal the operator of the car by lifting the acknowledging lever 37 of the acknowledging switch AS so as to bring the bridging piece 38 into engagement with the contacts 39 and 40, establishes a circuit to the brake controlling magnet valve M from the positive terminal B through contact 39, controller 38, contact 40, contact 42 of the slow-releasing acknowledging relay AR, wire 43, contact 4 of the speed governor G, assuming the operator has reduced the speed of the car to 10 miles per hour, wire 44, armature 24, coil of magnet M and to the negative terminal C. As soon as the train passes the track trip arm, the trip arm 1 or 2 swings back to its normal position to reclose its circuit controller, and the operator restores the acknowledging switch AS to its normal position, or at least he must do so before the release period of seven seconds for the relay AR has expired and the contacts 28 and 42 of that relay have opened. With the trip arm and the acknowledging switch AS back in their normal position, current is again supplied to the relay AR, and the magnet valve M now has a circuit that extends from the positive terminal B, circuit controllers of the trip arms 1 and 2, wire 25, contact 26, wire 27, contact 28 of relay AR, wire 43, contact 4 of the speed governor G, wire 44, armature 24, coil of M and to the negative terminal C. Under this condition, the operator may proceed at some speed at or below the set limit of 10 miles per hour until car encounters a caution or clear signal at which point a trackway reset arm will engage the car reset arm 3, which is now in its lower position. The tilting of the arm 3 as it engages the track reset arm closes the contacts 17—18 and current flows from positive terminal B through the circuit controllers of the arms 1, 2 and 3 in series and along wire 36 to reenergize the magnet $M^2$. With $M^2$ reenergized, the arm 3 is again raised to its disengaging position, but before the arm 3 is raised high enough to become disengaged from the trackway arm, the controller 33 is closed. The closing of controller 33 permits current to flow from battery terminal B, controllers of arms 1, 2 and 3 in series, wire 36 and thence through controller 33 to the winding of stick relay F to pick up this relay and once the stick contact 13 of relay F is closed, it is held energized by its normal stick circuit. Furthermore, the magnet M is then energized over its normal circuit and thus the speed control restriction removed. In the event the car encounters a second, third and successive stop signal, the operator can pass these successive stop signals without incurring a brake application only in the event that he acknowledge the stop signal by actuating the acknowledging switch AS in the same manner as described for the first stop signal. It is to be noted that the circuits are so arranged that the acknowledging switch AS cannot be held in its acknowledging position for more than the seven second release period of the AR relay without incurring a brake application. In the event the magnet M once becomes deenergized and its contact 24 open, it can be reenergized only by the operator actuating the reset switch RS so that current is supplied directly from the positive terminal B through the controller 45 of the reset switch to the coil of the magnet M. In actual practice, this reset switch RS is sealed requiring the operator to first break the seal before he can actuate the switch to close the controller 45. The breaking of the seal acts as a telltale that a stop signal has been passed at too high a rate of speed, or that the speed was increased to a rate above the set limit of 10 miles an hour after the stop signal was passed, or that the operator failed to acknowledge the stop signal by actuating the acknowledging switch AS.

In the form of the car carried apparatus shown in Fig. 3, a positive stop feature has been added to the equipment disclosed in the Fig. 1. In this Fig. 3, each trip arm 1 and 2 is provided with two circuit controllers both of which are normally closed. The additional circuit controllers for the trip arms 1 and 2 are designated by the reference characters 46 and 47, respectively. The reset arm 3 is likewise provided with a second circuit controller 48 which is normally closed. Associated with the circuit controllers 46, 47 and 48 is a stop relay SR. Inasmuch as the circuit for controlling the stick relay F of Fig. 3 is identical with that described for Fig. 1, it is though not necessary to repeat it here. The stop relay SR is normally energized by current supplied by the circuit extending from the positive terminal B through circuit controller 46 of trip arm 1, controller 47 of trip arm 2, wire 49, front contact 50, winding of relay SR and to the negative terminal C. An auxiliary path is provided for relay SR from the positive terminal B through the controller 48 of the reset arm 3, wire 51, wire 49, and as before traced. Relay SR is thus a stick relay which can be deenergized only in the event that one of the trip arms 1 or 2 and the reset arm 3 are both engaged at the same instant to open both paths from positive battery. Once this stick relay SR is deenergized however and its stick contact 50 opened, the relay can be restored only by closing the controller 45 of the sealed reset switch RS as will be evident by an inspection of Fig. 3. The brake controlling magnet M in this form of the car carried apparatus is normally supplied with current from positive terminal B through contact 52 of the stop relay SR, contact 14 of the stick relay F, winding of the magnet M and to the negative terminal C. A by-pass around the contact 14 of the stick relay F is provided through the contact 4 of the speed governor G, the same as in the forms of car carried apparatus disclosed in the Figs. 1 and 2.

At signal locations, such as shown in Fig. 7, where a positive stop is desired in the event a train passes a stop signal, the wayside trip arm and the wayside reset arm are located so that they engage their respective car carried arms at the same instant and furthermore, when a stop signal is displayed at such a location, both the track trip arm and track reset arm are held in their engaging position as will be fully described later. It follows that a train equipped with the apparatus of Fig. 3 cannot pass a stop signal at such a location at any speed whatsoever without incurring an automatic application of the brakes. That is to say that at all signal locations where the trip arm and reset arm are located as above pointed out, the speed governor G is rendered ineffective to permit a stop signal to be passed even at the low speed limit.

In Fig. 4 there is disclosed car carried apparatus wherein the positive stop feature described in connection with Fig. 3 has been added to the equipment disclosed in the Fig. 2. The circuits and apparatus for this complete car equipment of Fig. 4, being identical with those that have already been described in connection with the description of Figs. 1, 2 and 3, it is thought that further description will add nothing to the understanding of the apparatus disclosed in the Fig. 4, except to point out that in Fig. 4 two reset switches RS and $RS^1$ are provided. The function of RS is to restore the magnet M in the event it becomes deenergized due to the operator passing a stop signal, where a positive stop is not required, at too high a speed, or where he exceeds the speed limit, or failed to acknowledge a stop signal. The function of $RS^1$ is to restore the stop relay SR in the event a stop signal at a location where a positive stop is required has been passed.

In Fig. 5 are shown the wayside circuits preferably used in connection with the car apparatus of Figs. 1, 2, 3 and 4 of my invention when a positive stop is not required. The locations X and Y of Fig. 5 are automatic signal locations, while the location Z is an interlocking signal location.

As the wayside circuits other than those associated directly with the control of the trackway trip arm and the trackway reset arm form no part of my invention, only those circuits involved in this control will be described. The traffic rails are arranged in the usual track sections by locating an insulated rail joint in one rail—that is, the track circuits here disclosed are of the single return rail type, it being understood however, that I am in no way limited to this one method of arranging the traffic rails into track sections, but that my invention is equally adaptable to other forms of track circuits. Power for the operation of the trackway apparatus is obtained from a transformer designated by the reference character L with an exponent corresponding to its location, one of which transformers is located at each signal location. The primary 53 of each transformer is supplied with current from the feed wires BX110 and CX110 which are connected to some convenient source of alternating current not shown in the figures. The secondary 54 of each transformer L supplies current at the proper voltage to the traffic rails of an associated track section. A two element alternating current track relay TR is preferably provided for each track section. The track element 55 of each track relay TR is connected across the traffic rails at the end of the section opposite the transformer. The second element 56 of each track relay is permanently connected to the feed wires BX110 and CX110 by the wires 57 and 58, respectively.

Each signal location is provided with two control relays designated by the reference characters H and D with proper exponents. Taking relay $H^X$ for example, this relay is normally energized by current from the feed wire BX110 at location Y, wires 57 and 59, contact 60 of track relay $TR^Y$, line wire 61, contact 62 of the track relay $TR^X$, wire 108, its own front contact 64, winding of the relay $H^X$ and wire 58 to the feed wire CX110. The pick-up circuit for this relay $H^X$ branches from contact 62 along wire 63 to the contact 65 of the circuit controller of the automatic stop mechanism $T^X$ to be shortly described, thence to winding of $H^X$ and to wire CX110. It follows that the control relay $H^X$ is deenergized when either of the two track sections X—Y or Y—Z is occupied and track relay $TR^X$ or $TR^Y$, respectively, deenergized and once the relay is deenergized, it is reenergized through a contact 65 which is closed only when the associated automatic stop mechanism $T^X$ occupies its stop position as will be described later. The control relay $D^X$ is normally energized by current from the feed wire BX110 at location Y, wire 57, wire 166, contact 167 of a circuit controller operated by an automatic stop mechanism $T^Y$ to be later described, front contact 168 of the relay $H^Y$, line wire 169, winding of the relay $D^X$ and wire 170 to the feed wire CX110. Thus relay $D^X$ will be energized when the H relay for the location in advance of the location X is energized, and the automatic stop mechanism $T^Y$ is normal as shown in the figure. Each control relay H and D at automatic signal locations of my invention as disclosed in the Fig. 5, is controlled in a similar manner.

The H and D relays at each location govern the operating circuits for the wayside signal and the automatic stop mechanism. The wayside signals may be any standard type and are here shown as light signals, each automatic signal consisting of a single group of lights and each interlocking signal of two or more groups as is the usual practice. As the operating circuits for the wayside signals form no part of my invention, it is deemed sufficient for this application to say, that, in accordance with standard practice for a full block overlap control, when both relays H and D are energized the operating circuit for the clear signal is closed. When relay H is energized and relay D deenergized, the operating circuit for the caution signal is closed. When relay H is deenergized, the stop signal circuit is closed. To sum up, therefore, in Fig. 5, a clear signal is displayed at location X when both relays $H^x$ and $D^x$ are energized in response to track sections X—Y, Y—Z and the section in advance of location Z all being unoccupied. A caution signal is displayed when relay $H^x$ is up and relay $D^x$ down in response to sections X—Y and Y—Z being unoccupied and the section in advance of Z occupied. A stop signal is displayed when relay $H^x$ is down in response to either section X—Y or Y—Z being occupied.

The control relays $H^z$ and $D^z$ at the interlocking signal location Z of Fig. 5 will be controlled by track circuits not shown in a manner similar to that described for the automatic signal location X with an additional control of a lever of an interlocking machine (not shown), as is the standard practice. These relays $H^z$ and $D^z$ govern the operation of the top group of signal lights of the signal $2^z$ in the same manner as shown at the automatic signal locations X and Y. Other control relays such as relays $HCS^z$ and $DC^z$ are controlled in the usual manner by levers of an interlocking machine and these relays govern the operation of the lower group of signal lights of the signal $2^z$. As these circuits through levers of an interlocking machine form no part of my invention, they are omitted from the drawings for the sake of clearness.

At each signal location of Fig. 5, there is provided an automatic stop mechanism indicated by the reference character T with a proper exponent. Each stop mechanism includes a trip arm 66 and a reset arm 67, both of which are mounted on a single shaft 68 as shown in Figs. $8^a$, $8^b$ and 9 and indicated in Fig. 5 by a dotted line. Trip arm 66 is normally located outside the running rail and arranged to engage the car carried trip arm 1 or 2 depending upon which end of the car is ahead. The reset arm 67 is preferably located midway between the running rails to thereby engage the car carried reset arm 3 located on the center line of the car. The trip arm 66 and the reset arm 67 being mounted on the same shaft, they are positioned 90° apart so that when the trip arm 66 is raised to its position of engagement, the reset arm 67 is lowered to a position out of engagement and when the trip arm 66 is lowered out of engaging position, the reset arm 67 is raised to its engaging position. An alternative location of the reset arm 67 is shown in Fig. 9. With the reset arm 67 located outside the running rail as shown in Fig. 9, then two car carried reset arms are required in each car carried apparatus shown in Figs. 1 to 4, inclusive. Where two such car carried reset arms are provided, then the controllers 19 operated thereby would be connected in parallel, and the controllers 48 connected in series. The track trip arm 66 and the reset arm 67 may be operated in different ways but a preferred manner is to actuate the shaft 68 by the use of a pneumatically actuated piston 94 within a cylinder 69, as shown in Fig. 10 which is a cross-sectional view taken on the line X—X of Fig. 9. This mechanism may be mounted between the ties, as shown in Figs $8^a$ and 9. The control of the pressure to and from the cylinder 69 is by means of a magnet valve 70 as shown in Fig. 5. A spring 95 normally tends to rotate the shaft 68 to a position that raises the trip arm 66 and lowers the reset arm 67. When the magnet 70 is energized, pressure is admitted to the cylinder 69 to the right of piston 94 forcing the piston 94 against the action of the spring 95 to the left rotating the shaft 68 to lower the trip arm 66 and raise the reset arm 67. The controller associated with each stop mechanism is actuated by the operation of the shaft 68 in such a manner that contacts 78 and 167 at locations X and Y of Fig. 5 occupy the position shown when magnet 70 is energized and trip arm 66 is down and reset arm 67 is raised, and are moved to a lower position as shown at location Z of Fig. 5 when magnet 70 is deenergized and trip arm 66 is raised and reset arm 67 lowered.

At an automatic signal location such as the location X of Fig. 5, the magnet 70 of the stop mechanism $T^x$ is normally energized by current from feed wire BX110 along wire 71, contact 72 of the $H^x$ relay, wire 73, winding of the magnet 70 and wire 58 to the opposite feed wire CX110. Thus at all automatic signal locations, the trip arm 66 is held down out of train trip engaging position and the reset arm 67 raised to its engaging position when traffic conditions for the block immediately in advance are either "clear" or "caution". In order that the trip arm will be held in its clear position, when a train passes a clear signal, until the train has completely vacated the track section in the rear, a stick circuit for the magnet 70 is provided. Looking at location Y of Fig. 5, we find that with the trip mechanism $T^y$ clear and a train occupying both the sections X—Y and Y—Z so that both the track relays TR$^x$ and TR$^y$ are deenergized, there exists a circuit from the wire BX110 at the location X through wire 57, back contact 74 of relay TR$^x$, line wire 75, back contact 76 of the relay TR$^y$, wire 77, contact 78 of the circuit controller for the stop mechanism T$^y$ and closed when the mechanism is in a clear position, wire 73, magnet 70 and wire 58 to the feed wire CX110. As soon as the train vacates the section X—Y to the rear of location Y and its track relay TR$^x$ picks up, the trip arm 66 at once assumes its engaging position to control any following train.

At interlocking signal locations such as location Z of Fig. 5, the control of the automatic stop mechanism T$^z$ is modified somewhat from that at the automatic signal locations X and Y. The modification consists in the fact that the controlling magnet 70 of T$^z$ is energized when either the signal control relay H$^z$, or the signal control relay HCS$^z$ governed by a lever of an interlocking machine not shown is picked up to close its respective front contact 90 or 101 as will be evident by an inspection of the Fig. 5. Once the stop mechanism at location Z has been cleared and its controller contact 78 closed, it is held clear until the train has vacated the section to the rear over a stick circuit similar to that described for the stop mechanism at locations X and Y and which circuit includes its own controller contact 78 and a back contact of the track relay for both the section to the rear and the section in advance. Attention is called to the fact that inasmuch as the H relay which controls the clearing of the stop mechanism at location Z is in turn to be controlled through front contacts of the track relays for two track sections in advance of the signal similar to the H relays at locations X and Y, it is apparent that a full block overlap is provided also at the interlocking signal location Z. That is to say, at all signal locations of Fig. 5 the automatic stop mechanism is energized only when at least two track sections in advance are unoccupied and a control relay picked up to cause the display of either a caution or clear signal.

Considering the operation of the apparatus thus far, it is apparent that a car equipped with the apparatus shown in Fig. 1 and proceeding over trackway apparatus such as shown in the Fig. 5 can pass clear and caution signal locations without any automatic control. The reset arm 3 will engage the trackway reset arm 67 at each clear or caution signal but such engagement only results in the momentary closing of a pick-up circuit to the stick relay F on the car. In the event a train equipped with the apparatus of Fig. 1 passes a stop signal in Fig. 5, the trip arm 66 engages car trip arm 1 or 2 and the brake controlling magnet M becomes deenergized, if the speed is above 10 miles per hour, with the result that an automatic application of the brakes is initiated. In such event, as the train speed is reduced to 10 miles per hour, the contact 4 of the speed governor G is closed, and the magnet M is reenergized and the brakes released. However, as the train proceeds, it can do so only at a speed below the limit of 10 miles per hour until it encounters a caution or proceed signal at which point the reset arm 67 on the track engages the car reset arm 3 and the train apparatus is restored to normal in the manner previously described.

In the case of a car equipped with apparatus of Fig. 2, traveling over track apparatus of Fig. 5, it can pass clear or caution signals without automatic control, the same as the car with the apparatus of Fig. 1. In the case of the car with the apparatus of Fig. 2, the disengaging device DS will retain the reset arm 3 lifted to avoid impact between the reset arm 3 and the trackway reset arm 67 at the successive clear and caution signals. If the car in Fig. 2 encounters a stop signal then the operator must actuate the acknowledging switch AS in addition to reducing the speed to 10 miles per hour in order to pass the stop signal without incurring automatic control. In any event, at the stop signal, the reset arm 3 on the car is lowered as was previously described and is now in a position to engage the next track reset arm. In the case of Fig. 2, should a car pass the stop signal without acknowledging or at too high a rate of speed and the magnet M becomes deenergized to initiate a brake application, the operator in order to reset the apparatus must break the seal of the reset switch RS and reenergize magnet M through the means of the controller 45. After this the car can proceed at a speed at or below 10 miles per hour until a clear or caution signal is encountered at which point the apparatus will be restored to normal. A car equipped with the apparatus of Fig. 3 can likewise travel over the trackway apparatus of Fig. 5 and pass clear and caution signals without automatic control, for while the reset arm 3 will engage the track reset arm at each clear and caution signal only the pick-up circuit to the stick relay F and one path to the stop relay SR will be momentarily effected. At all stop signals of Fig. 5, the operation of the apparatus of Fig. 3 will be similar to that described in connection with the apparatus of Fig. 1. Again in the case of a car equipped with the apparatus of Fig. 4 traveling over track apparatus of Fig. 5, we find that the operation will be similar to that described in connection with the apparatus of Fig. 2.

In Fig. 6, a form of trackway apparatus is disclosed wherein there are provided separate mechanisms for operating the reset arm 67 and the trip arm 66 at an automatic signal location such as location X or Y of Fig. 5. Associated with the second mechanism designated by the reference character TP is a time element device designated by the reference character TER. By the use of such additional apparatus on the track, the same result is accomplished as that described by the use of the device DS on the car—that is, engagement between the car reset arm 3 and the track reset arm 67 is avoided at successive caution or clear signals. In other words, engagement between the reset arms occurs only at the first caution or clear signal after a car has passed a stop signal. At all such times, the speed of the train will not be over 10 miles per hour and the impact between the two reset arms relatively small. At other caution or clear signals, the train speed may be high and the impact between the two reset arms may be severe, requiring therefore massive arms in order to provide against possible breakage if disengaging devices are not provided.

The timing device TER of Fig. 6 may be of any of the various types but is shown as a time element relay; this relay TER being so arranged that its contacts are closed only after its energizing circuit has been closed for some predetermined time interval. The controlling circuit for the relay TER is so arranged that it is put into operation only as a train enters the track section to the rear and this circuit may be traced as follows: wire BX110, back contact of the track relay TR of the section to the rear of the location shown in Fig. 6, wire 96, contact 97 of the track relay for the section in advance, wire 98, coil of the relay TER and to the feed wire CX110. This relay is adjusted to close its front contact provided a train has proceeded through the track section to the rear of the signal at a speed equal to or less than the speed limit of the speed governor G. With the time element relay TER operating to close its front contact 99, a circuit is closed to the TP mechanism for the reset arm 67, which circuit extends from BX110 along wire 86, contact 99, wire 87, contact 88, wire 89, mechanism TP and to the feed wire CX110. The control of the trip arm mechanism T of Fig. 6 is identically the same as that pointed out for the control of the mechanism at locations X and Y of Fig. 5. It will be noted that in this Fig. 6, the mechanism TP is normally deenergized and it is so arranged that its arm 67 is held down out of engaging position by the action of the spring 95 of the mechanism. To raise the reset arm 67 up into its engaging position, the mechanism TP must be energized. The mechanism of the trip arm 66 in Fig. 6 is normally energized and trip arm 66 held out of engagement as was the case of the automatic stop mechanism of Fig. 5. When a train is operating at full speed past a clear signal, the mechanism TP for the reset arm 67 will not become energized while the train is traveling the section to the rear because the time element relay TER will not have had time to close the front contact 99 before the circuit to mechanism TP is opened at contact 88 by the deenergization of the H relay. If, however, a train has passed a stop signal in the rear and is proceeding at a slow speed, the time element relay TER will have had time to close its front contact 99 and thereby energize TP to raise the reset arm 67 to its engaging position. With the reset arm 67 raised, then the car equipment of any of the Figs. 1 to 4, inclusive, will be automatically reset and the speed control limitation removed. If the train has proceeded slowly through the section under a clear signal and relay TER has had time to function to cause reset arm 67 to be raised to its engaging position, the engaging of car reset arm 3 with arm 67 only results in the momentary closing of the pick-up circuit of car relay F. As a matter of fact, however, in installations where a second trackway mechanism TP is installed, the train carried disengaging device DS would be unnecessary. It is apparent from the foregoing description that the track apparatus of Fig. 6 will coordinate properly with the car equipment of Figs. 1, 2, 3 and 4, and also that in connection with the equipment of Figs. 2 and 4 the disengaging device DS may be omitted.

In Fig. 7 there is shown the track apparatus that may be used at an interlocking signal location where a positive stop is required. In this Fig. 7 a second mechanism TP and its associated time element relay TER are provided. In Fig. 7 the reset mechanism TP is normally deenergized and in the form of Fig. 7, the mechanism is so arranged that when it is deenergized its arm 67 is raised by the action of the spring 95 to its engaging position, whereas in the form shown in Figs. 5 and 6, the mechanism when energized raises the reset arm to the engaging position. As the normal position of the signal of Fig. 7 is stop, the trip mechanism T is normally deenergized and the trip arm 66 normally standing in its engaging position. Furthermore, the reset arm 67 and the trip arm 66 of Fig. 7 are to be so located that they will engage their respective car carried arms concurrently. In the event traffic conditions in advance are such that the operator can energize either the control relay H or the control relay HCS through the means of the controller or lever of the interlocking machine the mechanisms TP and T are energized. With either relay H or HCS picked up when current is supplied from the supply wire BX110 through the front contact 90 of relay H or the front contact 101 of the relay HCS depending on which relay the operator has selected, wire 91, back contact 92 of the time element relay TER, wire 93, mechanism TP and to the wire CX110. The energizing of TP lowers the reset arm 67 to its non-engaging position and also closes the controller contact 84. The closing of controller contact 84 establishes a circuit to the mechanism T that extends from BX110 through contact 90 or 101, wire 105, controller contact 84, wire 104, mechanism T and then to the wire CX110. The energizing of the mechanism T lowers the trip arm 66 to its non-engaging position and closes the controller contacts 78 and 103. The closing of controller contact 103 completes a shunt path that extends from the wire 105 to the wire 104 around the controller contact 84 permitting thereby mechanism T to be retained energized even after the mechanism TP has been deenergized and the controller contact 84 opened. It follows that with either relay H or HCS picked up to clear the signal of Fig. 7 the mechanisms TP and T are in turn energized to lower the reset arm 67 and the trip arm 66, respectively.

In the event a train is proceeding through the section to the rear of the signal in Fig. 7 at a low speed, as it will in the case it has passed a stop signal at the first location in the rear, the time element relay TER has picked up its armatures and opened the circuit to the mechanism TP at the contact 92 and the reset arm 67 has assumed its engaging position before the train reaches the signal of Fig. 7.

In the event the signal to the rear of the signal of Fig. 7 was at proceed so that the car advances through the section at normal speed, the time element relay TER would not have been energized for a sufficient interval to pick up its armatures and the car would pass the signal of Fig. 7 without engagement with either the reset arm 67 or the trip arm 66. If the signal in the rear is at proceed and the car advances through the section at low speed so that relay TER has functioned and reset arm 67 raised to its engaging position a momentary closing of the pick-up circuit for the car relay F will occur as pointed out hereinbefore. In order that the arms 66 and 67 be held in non-engaging position until the train has completely passed beyond the section, each mechanism is provided with a stick circuit. A stick circuit for the mechanism T extends from the wire BX110 through the back contact 74 of the track relay for the section to the rear, back contact 112 of track relay TR for the section in advance, wire 113, controller contact 78, mechanism T and to the wire CX110. The stick circuit for the TP mechanism is the same up to wire 113 from which point it extends through the back contact 114 of the time element relay TER, wire 115, controller contact 116 which is closed whenever arm 67 is in its non-engaging position, mechanism TP and to the wire CX110.

With the signal in Fig. 7 at stop, then both the trip arm 66 and the reset arm 67 are raised, as shown in the figure, and if a car equipped with the apparatus of either Figs. 3 or 4 passes such a stop signal location, the trip arm and the reset arm on the train will engage with their respective track arms concurrently. As explained in connection with Fig. 3, the concurrent swinging of the car trip arm 1 or 2 and the car reset arm 3 deenergizes the stop relay SR which results in an immediate application of the brakes irrespective of the speed of the car. In other words, the car apparatus of Figs. 3 and 4, with the trackway apparatus of Fig. 7, renders the speed control feature ineffective and assures a positive stop in the event a train passes a stop signal. It is to be pointed out that at signal locations where a positive stop is not required such, for example, as those disclosed in Figs. 5 and 6, the car carried apparatus of Figs. 3 and 4 will function to enforce speed control when a stop signal is passed.

If the signal of Fig. 7 is at stop and it is desirous to have the car advance past a stop signal, the operator may energize the call-on relay COS and then by one of the car crew closing the push button 80 a circuit is established that extends from the wire BX110 through the front contact 117 of the relay COS, push button 80, wires 118 and 93, mechanism TP and to the wire CX110. As soon as the arm 67 is lowered, and the controller contact 116 closed then current may be supplied through the front contact 119 of the relay COS, wires 120 and 115, controller contact 116, mechanism TP and to wire CX110.

The reset arm 67 will thus be held in non-engaging position as long as the relay COS is retained energized. It is to be noted that the trip mechanism T cannot be energized by means of the call-on relay COS and the push button 80 and it follows that a car advancing past the stop signal will have the low speed restriction set up. In other words the apparatus of Fig. 7 when used in conjunction with car equipment of Figs. 2 or 4, provides a positive stop in the case a stop signal is passed under usual operating conditions. By means of the relay COS and the push button 80 the operator can cooperate with the car crew to advance the car past the stop signal under low speed restrictions in a case of emergency conditions.

In the form of car carried apparatus embodying my invention disclosed in Fig. 11 the trip arm 1 and the reset arm 3 are to be mounted in tandem with reset arm 3 in the lead. That is to say, both the reset arm 3 and the trip arm 1 are to be mounted on a car on the same longitudinal center line with a given spacing between them and with the reset arm foremost. With this arrangement of the car carried arms the trackway arms will be mounted on the same longitudinal center line and with a spacing between them equal to that provided between the car carried arms. A preferred location for the trackway arms is outside of the traffic rails so that the car carried arms can be mounted on one side of the car. With such a tandem arrangement of the reset and trip arms clearances can readily be provided for the automatic stop arms with other roadway equipment and rolling stock, due to the fact that it will be necessary to provide but one location for the trip arms. In present installations of automatic stop systems employing trip arms, the trip and reset arms of my invention can all be installed without interfering with the present arrangement of the trip arm locations either on the car or on the trackway. It will be understood that where a second trip arm 2 is mounted on the opposite side of the car as described for Fig. 1 a second reset arm 3 will also be provided in tandem relation with the second trip arm. In this form of apparatus embodying my invention both the trip arm and the reset arm on the car each actuate two circuit controllers the same as described for the apparatus of Fig. 3. The stick relay F of Fig. 11 is normally retained energized by a stick circuit that includes a controller contact 121 actuated by the reset arm 3 in parallel with the controller contact 7 actuated by the trip arm 1 as can readily be traced in Fig. 11. The pick-up circuit for the relay F includes the controller contact 122 of trip arm 1 closed when arm 1 is in its normal position in series with a controller contact 123 of reset arm 3 closed when the arm 3 is actuated either to the right or to the left. It follows that to deenergize relay F of Fig. 11 it requires the reset arm 3 and the trip arm 11 to be actuated concurrently. To reenergize relay F requires the trip arm 1 to remain normal while the reset arm 3 is being actuated. The control of the brake controlling magnet M of Fig. 11 is the same as that disclosed for Fig. 1 and needs no further explanation. It will be noted however that the circuit to the magnet M is closed by the contact 4 of the speed governor G around the contact 14 of relay F.

The car carried apparatus of Fig. 12 is that of Fig. 11 with the positive stop feature added. In this form of apparatus embodying my invention two trip arms 1 and 100 together with a reset arm 3 are mounted all in a line and preferably arranged in the order of reset arm 3, trip arm 1 and trip arm 100 counting from the front end of the car. If the car is to be operated either end first then the three arms just mentioned will be duplicated on the opposite side of the car. In Fig. 12 the relay F has its stick circuit controlled through the controller contact 121 of reset arm 3 and the controller contact 7 of trip arm 1 in parallel and its pick-up circuit controlled through the contact 123 of reset arm 3 and contact 122 of trip arm 1 in series the same as described for Fig. 11. The positive stop relay SR has its stick circuit supplied with current through the controller contact 124 closed when reset arm 3 is normal in parallel with the controller contact 125 of trip arm 100 closed when arm 100 is normal as will be readily understood from an inspection of Fig. 12. The pick-up circuit for the stop relay SR is supplied with current through the contact 45 of the reset switch RS the same as described in connection with Fig. 3. The control of the brake controlling magnet M for the apparatus of Fig. 12 is the same as in Fig. 3 and needs no further description. It follows that to deenergize the stick relay F of Fig. 12 requires concurrent operation of reset arm 3 and trip arm 1. To reenergize relay F requires the actuating of the reset arm 3 with the trip arm 1 remaining normal. To deenergize the stop relay SR requires the concurrent operation of reset arm 3 and the trip arm 100.

In Figs. 13 and 14 are shown trackway circuits to cooperate with the tandem arrangement of the reset arm and trip arm of Fig. 11 and the three in a line arrangement of the reset arm and the two trip arms of Fig. 12. The circuits for Fig. 13 are those provided at an automatic signal location where a positive stop is not required. The control for the track relay TR, control relays H and D and the time element device TER are all the same as described in connection with Figs. 5 and 6 and it is thought that they need no further explanation except to again point out that relay H is energized only when both the first and second track sections in advance are unoccupied. The time element device TER is normally inactive and its energizing circuit closed as the train enters the track section to the rear and shunts the track relay of that section.

The trip arm 66 of the automatic stop mechanism T and the reset arm 67 of the mechanism TP are mounted on the same longitudinal center line and spaced apart a distance equal to the distance between the reset arm 3 and the trip arm 1 on the car. Thus a car passing these trackway arms will have its reset arm 3 and its trip arm 1 engaged concurrently when both the trackway arms are raised to their engaging positions, while if only one of the trackway arms, say arm 67, is raised the car carried arms will be engaged successively. The mechanisms for the trip arm 66 and the reset arm 67 are both normally energized and are so arranged that when energized the arms 66 and 67, respectively, are held down in non-engaging positions. The mechanism T is normally held energized by a circuit from the supply wire BX110 through the front contact 72 of relay H the same as pointed out in Fig. 5. Once arm 66 is lowered the mechanism is retained energized by a stick circuit that includes the normally closed contact 78 of its own circuit controller and the back contact 74 of the track relay for the section in advance and a back contact of the track relay TR for the track section in the rear in order to hold the arm 66 down until the entire train has passed the location. The mechanism TP is normally energized by a circuit extending from the supply wire BX110 through back contact 126 of the time element device TER, front contact 127 of relay H, mechanism TP and to the wire CX110. To hold arm 67 down out of engagement until the entire train has passed a location, mechanism TP is provided with a stick circuit that includes contact 116 of its own circuit controller closed as arm 67 is lowered, the back contact 74 of the track relay TR for the section in advance and the back contact of the track relay TR for the section to the rear as will be readily traced in Fig. 13.

When either a caution or a clear signal is displayed at the location of Fig. 13, that is, when relay H is energized in response to at least two track sections in advance being unoccupied, both track arms 66 and 67 are held down out of engaging positions and a car equipped with the apparatus of either Fig. 11 or 12 can pass at any speed without automatic control. With a train occupying either the first or the second track section in advance of the signal of Fig. 13 and the relay H deenergized the circuits to both trip mechanisms T and TP are deprived of current and arms 66 and 67 both raised to their engaging positions. Assume now that a car equipped with the apparatus of Fig. 11 attempts to pass at a speed above 10 miles per hour at which speed the contact 4 of the speed governor G is open. As reset arm 3 is the leading arm on the car it will first engage arm 67 but nothing will happen as the stick circuit for the relay F is at this time retained closed by the contact 7 of the arm 1 and also the pick-up circuit for the relay F is momentarily closed to energize the relay. When the car has advanced to a point where arm 3 engages the arm 66 the arm 1 will engage the arm 67 and both car carried arms 3 and 1 are actuated concurrently. Both branches of the stick circuit for the relay F are thus opened at the same time and the pick-up circuit is held open at the contact 122. Relay F being momentarily without energy it is deenergized and will remain so when the arms 3 and 1 swing back to the normal position. We have assumed that the speed of the car is above 10 miles per hour and thus as relay F becomes deenergized the magnet M is deenergized to initiate a brake application. As soon as the speed of the car is reduced to a point where the contact 4 is closed the magnet M is reenergized and the brakes released. The car can now advance only at a speed below that of 10 miles per hour until it encounters a caution or clear signal where the apparatus will be reset in a manner about to be pointed out.

Assume that the signal to the rear of the location of Fig. 13 was at stop and the car required to traverse the track section to the rear of the signal of Fig. 13 at the reduced speed. In the case the relay H of Fig. 13 has in the meantime become energized to clear the signal the circuits to the mechanisms T and TP are both closed as pointed out above and thus the arms 66 and 67 lowered. It will be recalled that as the car entered the track section to the rear the circuit to the time element device TER was closed and as the train is traveling at a low speed the time consumed before the train reaches the location of Fig. 13 is sufficient for the device TER to pick up its armature and open the contact 126. As the contact 126 opens, the circuit to the mechanism TP is ruptured and arm 67 is raised to its engaging position. As the car advances, its reset arm 3 engages the arm 67 and as its arm 1 is at this instant normal, the pick-up circuit to the relay F is closed and that relay reenergized. With relay F reenergized it will be held energized by its stick circuit although the arm 1 will also engage arm 67 as the car continues to advance, the relay F being held energized at this instant by the circuit through the contact 121 of arm 3. With relay F picked up, the speed restriction is removed and the car can then proceed from this point without speed control. In the case the signal of Fig. 13 is at stop as this car under speed restriction approaches, the arms 66 and 67 are both in their raised positions and although the relay F will be reenergized as the arm 3 engages arm 67 it will be at once deenergized again as soon as the car has advanced far enough so that arms 3 and 1 concurrently engage arms 66 and 67 and thus the speed control restriction is retained in effect at this second stop signal.

A car equipped with the apparatus of Fig. 12 at a signal location such as shown in Fig. 13 will have its relay F actuated in the same manner under all traffic conditions as just described for a car of Fig. 11. This is due to the fact that the relay F of Fig. 12 is governed by the arms 3 and 1 in the same manner as described for the apparatus of Fig. 11. The stop relay SR will never become deenergized at an automatic signal location such as shown in Fig. 13 although there may occur concurrent operation of the arms 1 and 100 at stop signals where both arms 66 and 67 are raised. The operation of the arm 1 does not affect the control of the relay SR and while arm 100 is being actuated the reset arm 3 is in its normal position and the stick circuit for relay SR held closed at the contact 124.

At interlocking signal locations where a positive stop is required in the form of my invention utilizing car carried arms mounted on the same longitudinal center line as shown in Fig. 12 a third mechanism TF operating a third trackway arm 128 is provided. As indicated in Fig. 14 these three arms 128, 66 and 67 are all mounted on the same longitudinal center line and in addition to having arms 66 and 67 so spaced that they will engage the car carried arms 3 and 1 concurrently, the arm 128 is so spaced with respect to arm 67 that there will occur concurrent engagement of arm 3 with arm 128, and arm 100 with arm 67. That is to say, the spacing for the trackway arms of Fig. 14 is to be made the same as that provided on the car so that simultaneous engagement of arm 3 with arm 128, arm 1 with arm 66 and arm 100 with arm 67 occurs whenever the trackway arms are all raised to their engaging positions. The control of the signal governing relays H, HCS, D and COS of Fig. 14 is to be the same as that described for the location Z of Fig. 5. The control of the time element device TER of Fig. 14 is modified to the extent that its energizing circuit is governed by the relays H and HCS. To be explicit the circuit for TER extends from BX110 through the back contact 74 of the track relay TR in the rear, front contact 138 of track relay TR in advance, either front contact 139 of relay HCS or front contact 140 of relay H, winding of time element device TER and to wire CX110.

The selecting of either relay H or relay HCS completes a circuit for the mechanism TP from wire BX110 through either front contact 90 of relay H or the front contact 101 of relay HCS depending upon which relay is selected, wire 91, back contact 92 of time element device TER, wire 93, mechanism TP and to the wire CX110. As mechanism TP operates to lower the arm 67, the contact 129 of its circuit controller is closed and a circuit is completed from wire 93 through contact 129, wire 130, back contact 131 of device TER, wire 132, mechanism T and to the wire CX110 to energize that mechanism. As mechanism T is actuated to lower its arm 66, the contact 133 of its controller is closed to complete a circuit from wire 132 through contact 133, wire 134, mechanism TF and to wire CX110 that actuates mechanism TF to lower its arm 128. It follows that the energizing of either the signalling control relay H or the relay HCS to clear the wayside signal causes the three trackway arms 67, 66 and 128 to be lowered successively. When mechanism TP is energized to lower its arm 67, its stick circuit as pointed out in connection with Fig. 7 is completed at the contact 116 of its own controller. This stick circuit which extends from wire 93 to wire 115 through contact 116 and thence through back contact 114 of device TER, back contact 112 of track relay TR for the section in advance and back contact 74 of the track relay TR for the section in the rear permits the holding of the mechanism TP energized until the entire train has passed the location. As mechanism T becomes energized, a stick circuit is closed that extends from wire BX110 through front contact 90 of relay H or front contact 101 of relay HCS, wires 91 and 135, contact 136 closed when arm 66 is lowered, wire 132, mechanism T and to wire CX110. Also, current will be supplied to this stick circuit for mechanism T from BX110 through back contact 74 of the track relay in the rear, back contact 112, wire 135 and thence as before traced. With this stick circuit for the mechanism T completed to retain mechanism T energized, current is also supplied to the mechanism TF from wire BX110, front contact 90 or 101, wire 91, back contact 92 of relay TER, wire 93, contact 116, wire 115, back contact 114, wire 135, contact 136, wire 132, contact 133, wire 134, mechanism TF and to wire CX110. It follows that once mechanisms T and TF have been energized and their respective arms lowered these mechanisms are retained energized as long as either of the signal control relays H or HCS are picked up, or until a train has completely passed the location.

The mechanism TF in addition to being energized by the circuit closed at the contact 133 of the circuit controller operated by the mechanism T, is also provided with a circuit from wire BX110 through the front contact 117 of relay COS when that relay is energized, push button 80 when depressed, mechanism TF and to the wire CX110. Once the mechanism TF is energized by this last circuit it is then retained energized irrespective of the push button 80 by the circuit through the front contact 119 of relay COS and its own controller contact 137, closed when arm 128 is lowered, as will be readily understood by an inspection of Fig. 14. That is to say, the mechanism TF can be energized and its arm 128 lowered by the tower operator acting to pick up the relay COS and a member of the car crew actuating the push button 80 irrespective of the position of the arm 66 or 67. Once mechanism TF is energized through the medium of the push button 80 and the relay COS, it is retained energized irrespective of the push button 80 as long as the tower operator retains the relay COS energized.

It is apparent that with the signal of Fig. 14 set to display a caution or clear indication at which time the trackway arms 67, 66 and 128 are all lowered to a nonengaging position a car equipped with the apparatus of Fig. 12 can advance past the signal without automatic control. With the signal of Fig. 14 at stop and the trackway arms raised to an engaging position a car having the apparatus of Fig. 12 attempting to pass will have its apparatus actuated as follows. When the leading arm 3 encounters the arm 67 nothing happens as the stick relay F on the car is held energized through the contact 7 of the arm 1 and also the pick-up circuit for the relay F is momentarily closed. The car advancing to where the arm 3 engages the trackway arm 66 the arm 1 will at the same time engage arm 67 and both branches of the stick circuit for the relay F are momentarily open and the pick-up circuit is also held open at the same time at contact 122. Relay F being thus deprived of current as the result of the concurrent actuating of arms 3 and 1, it is deenergized and the magnet M can be held energized only through the contact 4 of the speed governor G. When the car has advanced a little farther so that arm 3 engages trackway arm 128, arm 1 engages trackway arm 66 and arm 100 engages trackway arm 67 all at the same time. The relay F is thus retained deenergized as its pick-up circuit is held open, and both branches of the stick circuit for the stop relay SR are opened at the contact 125 of arm 100 and the contact 124 of arm 3, respectively. With stop relay SR momentarily deenergized it remains deenergized even after the car carried arms revert to their normal position. The deenergizing of relay SR deprives the brake controlling magnet M of current irrespective of the position of the contact 4 of the speed governor G and the car is brought to a stop at once. To release the brakes the car operator must break the seal to the reset switch RS and actuate that switch to bring the contact 45 to the position to close the pick-up circuit for relay SR. The relay F will remain deenergized although the stop relay is now restored to its normal position. While the car can now advance it can do so only at a speed below 10 miles per hour. In the event the car had encountered a stop signal at the location to the rear of the interlocking signal shown in Fig. 14 and the interlocking signal then cleared, the three trackway arms will be lowered successively in a manner described above to permit the passage of the car. The car upon entering the section to the rear shunts the track relay of that section and the energizing circuit to the time element device TER is thus closed with the H or HCS relay is picked up to clear the signal. The car advancing through the section under the speed restriction will give the time element device TER sufficient time to pick up its armature and open the contact 92 in the circuit to the mechanism TP before the car reaches the trackway arms. With the mechanism TP deenergized the arm 67 is at once raised to its engaging position and thus as the car advances and its reset arm 3 engages the arm 67 the pick-up circuit to the relay F is closed and that relay reenergized with the result that the speed restriction is removed. Relay F will now remain energized even though the car carried arms 1 and 100 will in turn engage the trackway arm 67 as the car advances due to the fact that both arms 66 and 128 are held down out of engagement and the circuit to the relay F thus held closed at the contact 121 of arm 3 during the time arms 1 and 100 are actuated. The actuating of the arm 100 by its engagement with the arm 67 will not affect stop relay SR as its stick circuit is now held closed at the contact 124 of arm 3. For a car to pass a stop signal in Fig. 14 without the deenergizing of the stop relay SR the train crew must cooperate with the towerman and close the push button 80 after the towerman has energized the relay COS so that the mechanism TF is energized and the arm 128 lowered out of its engaging position in the manner described above. With both arms 67 and 66 raised but arm 128 lowered a car upon advancing past the location will have both arms 3 and 1 concurrently actuated and the stick relay F deenergized to put into effect the speed restriction. As arm 100 engages the trackway arms 67 and 66 the stick circuit for the relay SR remains closed at the contact 124 and thus a positive It will be apparent that the trackway arm 67 of both Figs. 13 and 14 may be made a fixed arm positioned in the engaging position should it seem desirable to do so. Although arm 67 may be made a fixed arm neither the stop relay SR nor the stick relay F will be deenergized when a car passes a caution or clear signal and the car carried arms engage this fixed arm, due to the fact that while one car carried arm is in engagement with the fixed arm the circuits to the relays SR and F are held closed by contacts of one of the other car carried arms. An analysis of the circuits of Figs. 11 and 12 will disclose that an acknowledging switch AS and its associated relay AR such as shown in Figs. 2 and 4 can readily be applied to the apparatus of either Fig. 11 or 12 should it seem desirable to do so. Furthermore, it will be evident from the above disclosures and description that various arrangements of the apparatus of my invention may be provided each of which provides a complete system, each complete system having, of course, different characteristics.

Although I have herein shown and described only certain forms of apparatus embodying my invention, it is understood that various changes and modifications may be made therein within the scope of the appended claims without departing from the spirit and scope of my invention.

Having thus described my invention, what I claim is:

1. An automatic control system for railways including, a first stick relay and a second stick relay on the car and both normally energized, a brake controlling magnet controlled jointly by said stick relays; a car carried trip arm and a car carried reset arm to jointly control said stick relays, and arranged to deenergize the first stick relay only when the trip arm only is actuated, to deenergize both stick relays when the trip arm and the reset arm are concurrently actuated, and to reenergize said first stick relay when the reset arm only is actuated, and traffic controlled trackway means to actuate the said car carried trip and reset arms.

2. In combination, a car carried stick relay to effect a proceed condition when energized and a stop condition when deenergized, a car carried reset arm, a trackway reset arm to engage the car carried reset arm under proceed traffic conditions, car carried means rendered active to energize said stick relay by the engaging of said reset arms, and means to hold the car carried reset arm out of position to engage the trackway reset arm as long as said stick relay is energized and to move the car carried reset arm to its engaging position in response to the deenergizing of said stick relay.

3. A speed control system for railways comprising, a car carried automatic car governing means including a device responsive to the speed of the car, a car carried trip arm, a trackway trip arm adapted to engage said car carried trip arm under certain adverse traffic conditions, means responsive to the engaging of said trip arms to render the automatic means effective to establish a predetermined speed limit, a car carried reset arm, a trackway reset arm adapted to engage said car carried reset arm under favorable traffic conditions, means responsive to the engaging of said reset arms to render said automatic means effective to cancel said predetermined speed limit, other trackway means to effect concurrent engagement of the said trip arms and the said reset arms, and means responsive to such concurrent engagement to render the automatic means effective to stop the car.

4. A speed control system for railways including, a car carried brake controlling magnet, a car carried trip arm to control said magnet, a trackway trip arm positioned to engage said car carried trip arm under certain adverse traffic conditions to thereby control said magnet, a speed governed means responsive to the speed of the car to cancel the control of said trip arms over the magnet at a predetermined speed, a car carried reset arm, a trackway reset arm positioned to engage said car carried reset arm under favorable traffic conditions to restore the control of said car carried trip arm over said magnet, and trackway means to position both the trackway trip arm and the trackway reset arm to engage their respective car carried arms at the same time under certain other adverse traffic conditions to exert a control over the magnet which the said speed governed means cannot cancel.

5. A speed control system for railways including, a first stick relay and a second stick relay on the car and both normally energized, a brake controlling magnet jointly controlled by the stick relays, means responsive to the speed of the car to annul the control of the first stick relay at a predetermined speed but not the control of the second stick relay, a car carried trip arm and a car carried reset arm to jointly control said stick relays and arranged to deenergize the first stick relay when the trip arm only is actuated and to deenergize both stick relays when the trip arm and the reset arm are concurrently actuated, and traffic controlled trackway means to actuate the said car carried trip and reset arms.

6. A speed control system for railways including, a first stick relay and a second stick relay on the car and both normally energized, a brake controlling magnet jointly controlled by the stick relays, means responsive to the speed of the car to annul the control of the first stick relay at a predetermined speed but not the control of the second stick relay, a car carried trip arm and a car carried reset arm to jointly control said stick relays and arranged to deenergize the first stick relay when the trip arm only is actuated and to deenergize both stick relays when the trip arm and the reset arm are concurrently actuated, manually actuated means to reenergize the second stick relay, means effective when the reset arm only is actuated to reenergize the first stick relay, and traffic controlled trackway trip arm and reset arm to respectively actuate the car carried trip and reset arms.

7. A speed control system for railways including, a first stick relay and a second stick relay on the car and both normally energized, a brake controlling magnet jointly controlled by the stick relays, a speed governed means, an acknowledging device, means controlled jointly by the speed governed means and the acknowledging device to annul at a given speed the control of the first stick relay but not that of the second stick relay, a car carried trip arm and a car carried reset arm to jointly control said stick relays and arranged to deenergize the first stick relay when the trip arm only is actuated and to deenergize both stick relays when the trip arm and the reset arm are concurrently actuated, and a traffic controlled trackway trip arm and a reset arm to respectively actuate the car carried trip and reset arms.

8. In combination, a track section, a trackway reset arm having an engaging and a non-engaging position and normally occupying its non-engaging position, a time element device, a circuit to render the time element device active in response to a train entering the track section, means controlled by the time element device when active for a predetermined time interval to position the trackway reset arm in its engaging position, a car carried automatic device having a proceed and a stop condition, a car carried reset arm adapted to engage the trackway reset arm when in its engaging position, and means rendered effective by the engaging of said reset arms to establish the said automatic device in its proceed condition.

9. In combination, a track section, a trackway reset arm having an engaging and a non-engaging position and normally occupying its non-engaging position, a time element device, a circuit to render the time element device active in response to a train entering the track section, means controlled by the time element device when active for a predetermined time interval to position the trackway reset arm in its engaging position, a car carried automatic speed control device having a high speed and a low speed condition, a car carried reset arm adapted to engage the trackway reset arm when in its engaging position, and means rendered effective by the engaging of said reset arms to establish the high speed condition of said automatic speed control device.

10. In combination, a track section, a wayside signal normally at stop, a trackway reset arm having an engaging and a non-engaging position and normally occupying its engaging position, means to move said reset arm to its non-engaging position in response to the clearing of the said signal, a time element device rendered active in response to a train entering the section, means controlled by the time element device when active for a predetermined period of time to move the reset arm to its engaging position, a car carried automatic speed control device having a high speed and a low speed condition, a car carried reset arm adapted to engage the trackway reset arm when in its engaging position, and means rendered effective by the engaging of said reset arms to establish the high speed condition of said automatic speed control device.

11. An automatic control system for railways including, a relay on the car normally energized, a brake controlling magnet controlled by said relay, a car carried trip arm and a car carried reset arm to jointly control said relay and arranged to deenergize said relay only when said trip arm and said reset arm are concurrently actuated and to reenergize the relay when the reset arm only is actuated, and traffic controlled trackway means to actuate said trip and reset arms concurrently under adverse traffic conditions and to actuate said reset arm only under clear traffic conditions.

12. An automatic control system for railways including, a car carried trip arm and a car carried reset arm, a brake controlling magnet controlled jointly by said trip and reset arms arranged to be deenergized only when said arms are actuated simultaneously and to be reenergized when the reset arm only is actuated, and traffic controlled trackway trip arms to actuate under certain traffic conditions said car carried trip and reset arms simultaneously and to actuate under other traffic conditions said car carried reset arm only.

13. An automatic control system for railways including, a plurality of car carried trip arms, a car governing magnet controlled jointly by said plurality of trip arms arranged to be deenergized only upon simultaneous action of all of said trip arms and to be reenergized only when a given one of said arms is actuated alone, and a plurality of traffic controlled trackway trip arms adapted to engage said car carried arms and arranged to engage all of said car carried arms simultaneously under certain traffic conditions and to engage said given car carried arm only under other traffic conditions.

14. An automatic control system for railways including, two car carried trip arms each adapted to operate circuit controlling contacts, a car governing relay, a normally closed circuit for said relay including two circuit controlling contacts in parallel one actuated by each of said trip arms, two trackway trip arms arranged to operate said car carried trip arms concurrently under certain traffic conditions to thereby deenergize the relay, and a car brake controlling magnet controlled by said relay.

15. An automatic control system for railways including, a car carried stick relay, a car carried trip arm and a car carried reset arm, a normally closed stick circuit for normally energizing the relay and controlled jointly by said trip and reset arms arranged to be ruptured only when said car carried arms are actuated simultaneously, a pick-up circuit for said stick relay adapted to be closed when said reset arm only is actuated, two trackway trip arms, traffic controlled means for causing the two trackway trip arms to simultaneously engage the car carried arms under adverse traffic conditions and to engage the reset arm only under favorable traffic conditions, and a brake controlling magnet controlled by said stick relay.

16. An automatic control system for railways including, three car carried trip arms mounted all in a line and with an equal given distance between them, three trackway trip arms located all in a line with the same said equal given distance between them; means for causing engagement between a single car carried trip arm and a trackway trip arm under one traffic condition, and concurrent engagement of two car carried trip arms with two trackway trip arms under another traffic condition and concurrent engagement of all three car carried arms with the three trackway arms under still another traffic condition, and a car governing means jointly controlled by the car carried trip arms.

17. An automatic control system for railways including, three car carried trip arms mounted all in a line, three trackway trip arms located all in a line and adapted to engage said car carried trip arms, a first traffic controlled means for causing concurrent engagement between two car carried trip arms and two trackway trip arms to establish a low speed condition for said car, a second traffic controlled means for causing concurrent engagement between all three car carried arms and the three trackway arms to establish a positive stop condition for said car, and a third traffic controlled means for causing engagement between a single car carried arm and a trackway arm for establishing a high speed condition for said car.

18. An automatic control system for railways including; a first, second and third car carried trip arm mounted all in a line; a plurality of trackway trip arms adapted to engage said car carried trip arms, a first traffic controlled means for causing concurrent engagement between the first and second car carried arms and two of said trackway arms to establish a low speed condition for said car, a second traffic controlled means for causing concurrent engagement between the first and third car carried arms and two of said trackway arms to establish a positive stop for said car, and a third traffic controlled means for causing engagement between the first car carried arm and a given trackway arm to establish a high speed condition for said car.

19. An automatic control system for railways including, two trackway trip arms located on the same longitudinal center line with respect to the traffic rails, traffic controlled means to raise or lower either one or both of said trip arms in accordance with different traffic conditions, car carried arms mounted in tandem adapted to engage the trackway trip arms either singly or concurrently, and car carried car governing devices selectively controlled in response to engagement between said car carried arms and said trackway trip arms.

20. An automatic control system for railways including, a plurality of trackway contact devices located on the same longitudinal center line with respect to the traffic rails, traffic controlled means to selectively raise or lower different combinations of said contact devices into or out of engaging positions in accordance with different traffic conditions, a plurality of car carried contact devices all mounted on the same center line adapted to cooperate with the trackway contact devices arranged to engage the different combinations of said trackway devices when raised into engaging positions to selectively establish a control condition of car governing means corresponding to the traffic condition selecting the combination.

21. An automatic control system for railways including, a plurality of trackway contact devices located on the same longitudinal center line with respect to the traffic rails, traffic controlled means to render active different combinations of said trackway contact devices in accordance with different traffic conditions, a plurality of car carried contact devices all mounted on the same center line adapted to cooperate with the trackway contact devices arranged to be controlled by the different combinations of said trackway devices when active to selectively establish a control condition of car governing means corresponding to the traffic condition selecting the combination.

In testimony whereof I affix my signature.

HOWARD A. THOMPSON.